United States Patent [19]

Mason

[11] 4,214,771

[45] Jul. 29, 1980

[54] COUPLING DEVICE

[75] Inventor: Lonnie L. Mason, Visalia, Calif.

[73] Assignee: Vernon T. Mullican, Tulare, Calif.

[21] Appl. No.: 959,578

[22] Filed: Nov. 13, 1978

[51] Int. Cl.³ .............................................. B60D 1/00
[52] U.S. Cl. .................................... 280/402; 414/436; 414/563
[58] Field of Search ...................... 280/477, 402, 414.5; 414/479, 494, 563, 436, 469, 471, 474, 475, 476, 434

[56] References Cited

U.S. PATENT DOCUMENTS

| | | | |
|---|---|---|---|
| 1,851,349 | 3/1932 | Cowles | 280/402 |
| 2,628,733 | 2/1953 | Hale | 280/402 |
| 2,826,432 | 3/1958 | Clever | 280/477 |
| 3,319,977 | 5/1967 | Quandt | 280/477 |
| 3,758,135 | 9/1973 | Kniff | 280/402 |
| 3,885,815 | 5/1975 | Kniff | 280/402 |
| 3,984,120 | 10/1976 | Boveia | 280/402 |

Primary Examiner—John J. Love
Assistant Examiner—Randall A. Schrecengost
Attorney, Agent, or Firm—Huebner & Worrel

[57] ABSTRACT

A coupling device for towing a vehicle, the device having a first member; a mount borne by the first member for mounting the first member on a towing vehicle for substantially pivotal movement about a point of reference between alternate inclined and connecting attitudes; a second member adapted to be mounted on a vehicle to be towed and engageable with the first member for movement therealong between positions on opposite sides of the point of reference to move the first member between the inclined and connecting attitudes; and a mechanism for lockably interconnecting the first and second members in the connecting attitude.

11 Claims, 9 Drawing Figures

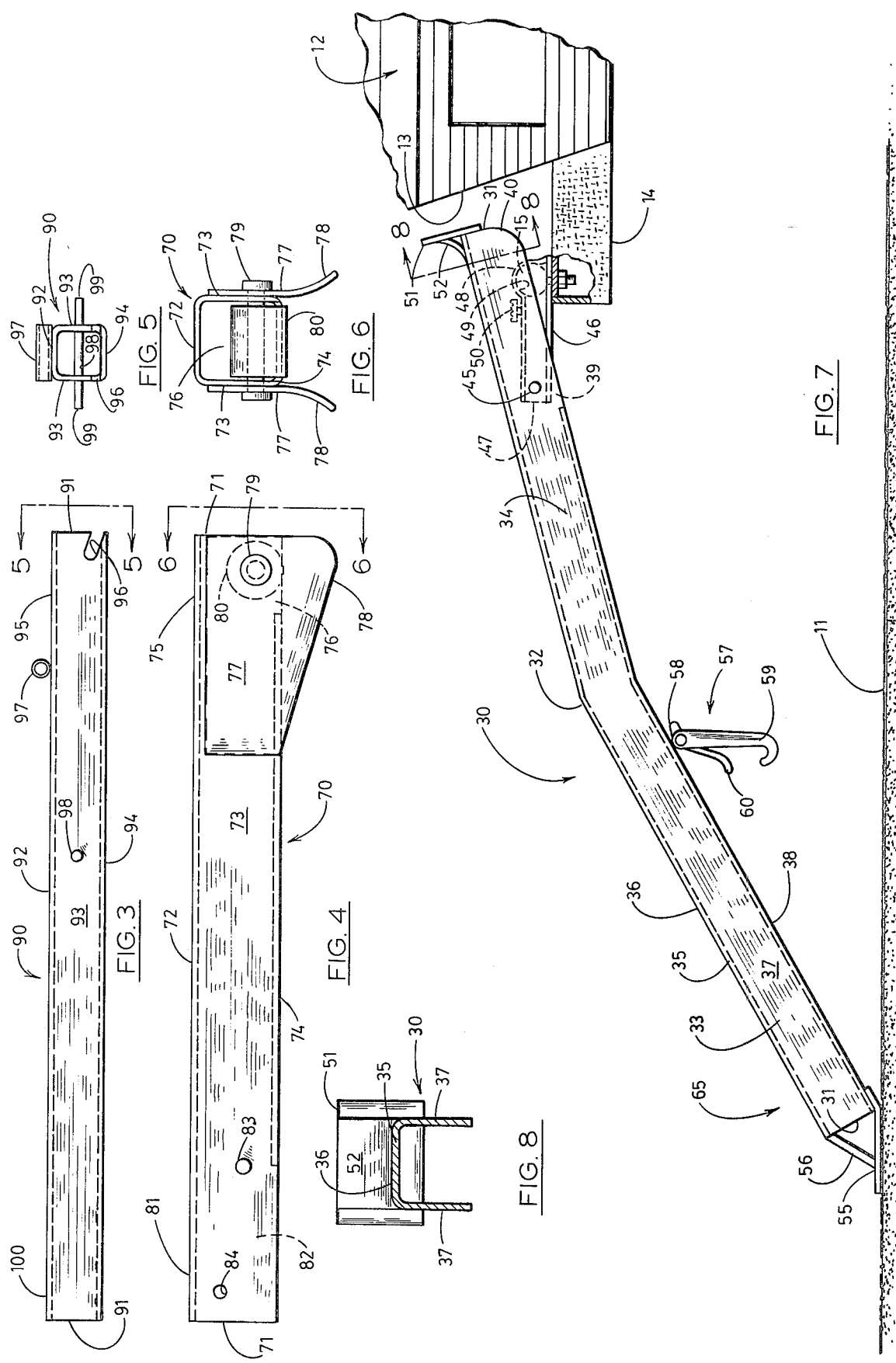

COUPLING DEVICE

BACKGROUND OF THE INVENTION

1. Field of the Invention

The present invention relates to a coupling device and more particularly to such a coupling device which is operable conveniently, efficiently and securely to connect a vehicle to be towed with a towing vehicle while simultaneously elevating a pair of wheels of the vehicle to be towed from ground engagement without the use of any auxiliary lifting equipment or assistance.

2. Description of the Prior Art

Characterizing the closest prior art of which the applicant is aware and in compliance with 37 C.F.R. § 1.97 and § 1.98, attention is invited to the following patents, copies of which are attached:

U.S. Pat. No. 1,851,349, Cowles; Mar. 29, 1932
U.S. Pat. No. 2,628,733, Hale; Feb. 17, 1953
U.S. Pat. No. 3,758,135, Kniff; Sept. 11, 1973
U.S. Pat. No. 3,885,815, Kniff; May 27, 1975
U.S. Pat. No. 3,984,120, Boveia; Oct. 5, 1976

The Cowles U.S. Pat. No. 1,851,349 discloses a vehicle coupling operable to interconnect a vehicle to be towed and a towing vehicle through movement of the vehicles relative to each other. The coupling utilizes a slidable draft bar and rollers.

The Hale U.S. Pat. No. 2,628,733 relates to a towing dolly which employs a winch in combination with a trailer having a pivotal bed to elevate a pair of ground engaging wheels of a vehicle to be towed.

The Kniff U.S. Pat. No. 3,758,135 is directed to an automobile tow bar operable for use in towing a vehicle with a pair of ground engaging wheels elevated from such ground engagement.

The Kniff U.S. Pat. No. 3,885,815 discloses a towing device operable for towing a vehicle with the rear wheels thereof out of ground engagement.

The Boveia U.S. Pat. No. 3,984,120 reveals an auto towing apparatus incorporating a hoist assembly in combination with a frame for elevating a pair of wheels of an automobile to be towed from ground engagement.

The difficulties associated with the towing of one vehicle by another are many. Of course, the primary objective is simply to establish interconnection of the two vehicles. However, the vehicle to be towed is often smaller and lower to the ground than the towing vehicle which can interfere with linking of the two vehicles. Although commercial towing vehicles employ various mechanisms for establishing interconnection in such cases, these mechanisms are frequently quite expensive and impractical for use in non-commercial evironments. Normally the only facility available for use on a towing vehicle in non-commercial situations is a conventional ball hitch.

Another impediment is that most vehicles require either the front or rear wheels thereof to be lifted out of ground engagement for towing if damage is to be avoided. The problem resides in the fact that lubricating oil is not supplied to portions of certain vehicles, such as the transmission, when the engine is not in operation. In many vehicles towing causes these portions to be operated and serious damage may be the result. Accordingly, in order to avoid such damage it has heretofore been necessary to use a winch of some type to raise the front or rear of the vehicle, as recommended, out of ground engagement and then to interconnect the vehicles for towing. In other cases, jacks are used to elevate the appropriate portion of the vehicle. In any event, these operations often require the attention of two or more persons working in cooperation for a lengthy period of time and under rather dangerous conditions to achieve the desired result.

Therefore, it has long been known that it would be desirable to have a coupling device which could rapidly be operated by a single individual conveniently, effectively and safely to interconnect a pair of vehicles while simultaneously raising a pair of wheels of one of the vehicles out of ground engagement for towing without risk of damage to either vehicle.

SUMMARY OF THE INVENTION

Therefore, it is an object of the present invention to provide an improved coupling device.

Another object is to provide such a device which can be operated to interconnect a towing vehicle and a vehicle to be towed while simultaneously elevating, as desired, the front or rear wheels of the vehicle to be towed from ground engagement to a position fully compatible with towing.

Another object is to provide such a device which permits a single individual rapidly and conveniently to interconnect a vehicle to be towed and a towing vehicle without the use of auxiliary equipment.

Another object is to provide such a device which is adaptable for use on virtually all types of vehicles, both commercial and private, at relatively minimal expense and which is operable with relative ease without specialized training.

Another object is to provide such a device which permits a vehicle to be towed over long periods of time and under a variety of conditions without risk of damage.

Another object is to provide such a device which in operation permits a vehicle to be towed effortlessly without risk of personal injury either during the towing operation itself or during the connection and disconnection of the vehicles.

Another object is to provide such a device which is adaptable for use in towing vehicles having either manual or automatic transmissions, or front or rear wheel drive by raising either the front or rear wheels of the vehicle to be towed as necessary to avoid damage.

Another object is to provide such a device which does not require the use of winches, jacks or other auxiliary equipment in establishing the interconnection of the vehicles involved.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 3 is a somewhat enlarged side elevation of a mounting member of the coupling device.

FIG. 4 is a side elevation of a control member of the coupling device.

FIG. 5 is an end view taken on line 5—5 in FIG. 3.

FIG. 6 is an end view taken on line 6—6 in FIG. 4.

FIG. 7 is a somewhat reduced fragmentary side elevation showing a ramp member of the device mounted on a towing vehicle and disposed in an inclined attitude.

FIG. 8 is a somewhat enlarged transverse section taken on line 8—8 in FIG. 7.

DESCRIPTION OF THE PREFERRED EMBODIMENT

Figure 1:
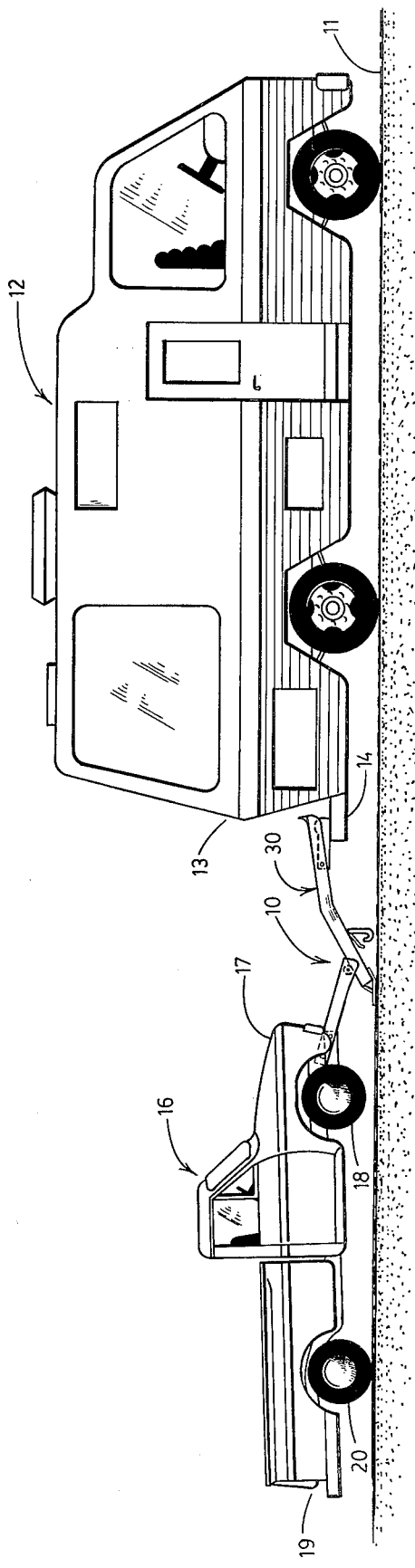
FIG. 1 is a side elevation of the coupling device of the present invention in a typical operative environment illustrating the relative positions of the vehicle during the coupling operation.

Referring more particularly to the drawings, the coupling device of the present invention is generally indicated by the numeral 10 in FIG. 1. In the illustrative environment of the drawings, a supporting, ground, or earth's surface is indicated at 11. A motor home or towing vehicle 12 has a rear portion 13 on which is mounted a rear bumper 14. A conventional ball hitch or support 15 is secured in upstanding relation on the rear bumper substantially centrally thereof.

A vehicle to be towed is generally indicated at 16. The vehicle has a front portion 17 mounting ground transporting front wheels 18. The vehicle 16 has a rear portion 19 and mounts a pair of rear ground mounting wheels 20. As will hereinafter be more fully described, the vehicle to be towed can be of virtually any type. It will be understood, however, that the vehicle 16 is of conventional construction with a body and frame mounting an engine in the front portion and providing drive to the rear wheels 20 thereof through a drive train.

The coupling device 10 has a first or ramp member 30 having opposite ends or end portions 31. The ramp member has a central bend 32 substantially midway between the opposite bends thereby defining a lower portion 33 and an upper portion 34. The ramp member is preferably constructed of square metal tubing. The ramp member thus has an upper wall 35 having an upper surface 36. The ramp member has opposite, substantially parallel side walls 37 and a lower wall 38. The lower wall 38 of the ramp member terminates a distance short of the opposite end of the upper portion 34 of the ramp member. This affords a recess 39 in the upper portion of the ramp member defined by the upper wall 35 and side walls 37, as best shown in FIG. 7. The side walls 37 at the opposite end portion 31 of the ramp member on opposite sides of the recess 39 preferably have rounded or beveled portions 40.

A pin 45 serving, as will hereinafter be described, as a point of reference is mounted on and interconnects the side walls 37 of the upper portion 34 of the ramp member 30 within the recess 39. A conventional hitch 46, having a rear portion 37, is mounted on the pin 45 at its rear portion for pivotal movement about the pin with the recess and therefrom, as best shown in FIG. 7. The hitch has a front portion 48 enclosing a ball socket 49. A screw handle 50 is borne by the hitch and is operable in the conventional manner effectively to enlarge or reduce the size of the ball socket 49. When the ball hitch 15 of the towing vehicle 12 is received and captured in position in the ball socket 49 of the hitch 46, the hitch, and thus the ramp member, can be pivoted laterally about the ball hitch, but cannot be removed therefrom without expansion of the ball socket using the screw handle 50.

A stop assembly 51 is affixed, as by welding, on the opposite end portion 31 of the upper portion 34 of the ramp member 30 in upstanding relation, as best shown in FIGS. 7 and 8. The stop assembly has a concave surface 52 extending arcuately from the upper surface 36 of the upper wall 35.

A slide plate 55 is mounted, as by welding, on the opposite end portion 31 of the lower portion 33 of the ramp member 30. A brace 56 interconnects the opposite end and the remote portion of the slide plate, as best shown in FIG. 7. A lock assembly 57 is secured on the lower wall 38 of the lower portion 33 of the ramp member in a predetermined position adjacent to the central bend 32 of the ramp member. The lock assembly has an over center or toggle linkage 58 on which are pivotally mounted a pair of hooks or latches 59. The latches are borne by the toggle linkage in sufficiently spaced relation to be pivoted upwardly about opposite sides of the ramp member and are of a sufficient length to extend a predetermined distance above the upper surface 36 of the upper wall 35 to the positions shown in full lines in FIG. 9. The lock assembly has a lever arm 60 which is operable to draw the latches into engagement with a pin in locking relation, as will hereinafter be described.

Figure 9:
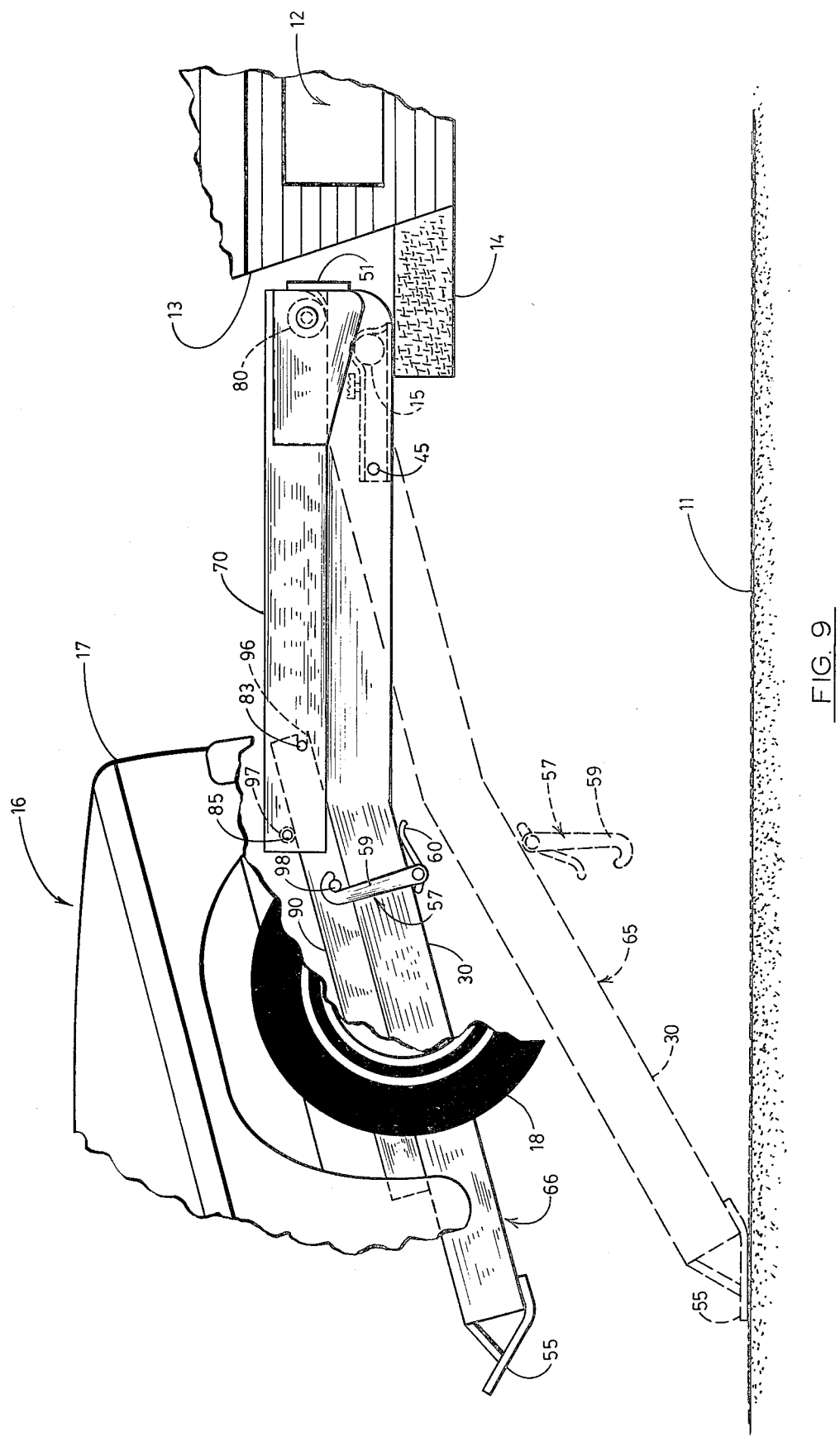
FIG. 9 is a somewhat reduced fragmentary side elevation of the coupling device interconnecting two vehicles and showing the inclined attitude in phantom lines and a connecting attitude in full lines.

The ramp member 30 is adapted to be mounted in position on the towing vehicle 12 for pivotal movement between a lowered, releasing or inclined attitude 65 and an elevated, raised or connecting attitude 66, as best shown in FIG. 9.

The coupling device 10 has a second or control member 70 having opposite ends 71. The control member is preferably constructed of square metal tubing so as to have an upper wall 72, a pair of parallel side walls 73 and a lower wall 74. The control member has a supporting, or front end portion 75. The lower wall 74 of the front portion 75 is cut away to form a recess 76 extending within the front portion of the control member. A pair of guide plates 77 having lower, outwardly curved or flared portions 78 are individually secured on the side walls 73 at the front portion 75 of the control member. A pin 79 is extended through the guide plates 77, side walls 73 and through the recess 76, as best shown in FIG. 6. A roller 80 is mounted for rotational movement on the pin 79 within the recess 76.

The control member 70 has a rear portion 81. The lower wall 74 of the rear portion is cut away to provide a recess 82. A pin 83 is mounted on and extended between the side walls 73 at the rear portion of the control member so as to extend through the recess 82 in a predetermined position, as best shown in FIG. 4. A pair of pin holes 84 are individually provided in the side walls 73 of the control member at the rear portion 81 thereof. A pin 85, as shown in FIG. 9, is dimensioned slidably to be received in the pin holes 84 so as to be positionable to interconnect the side walls of the control member.

The coupling device 10 has a mounting member 90 having opposite ends 91. The mounting member is also preferably constructed of square metal tubing. Thus the mounting member has an upper wall 92, opposite parallel side walls 93 and a lower wall 94. The mounting member has a front portion 95. A diagonal pin slot 96 is formed in the side walls 93 of the front portions 95 extending from the opposite end 91 thereof adjacent to the lower wall 94 upwardly and rearwardly along a diagonal path as best shown in FIG. 3. A sleeve 97 is secured, as by welding, on the upper wall 92 of the front portion of the mounting member in a predetermined position extending transversely of the mounting member. The distance between the interior end of the slot 96 and the sleeve 97 is substantially the same as the distance between the pin 83 and pin holes 84 of the control member 70. A pin 98 is mounted on and interconnects the side walls 93 of the mounting member at a predetermined position and has opposite ends 99 extending outwardly through and laterally of the side walls, as best shown in FIG. 5. The length of the pin 98 is greater than the distance between the latches 59 of the lock assembly 57. The mounting member has a rear portion 100.

OPERATION

Figure 2:
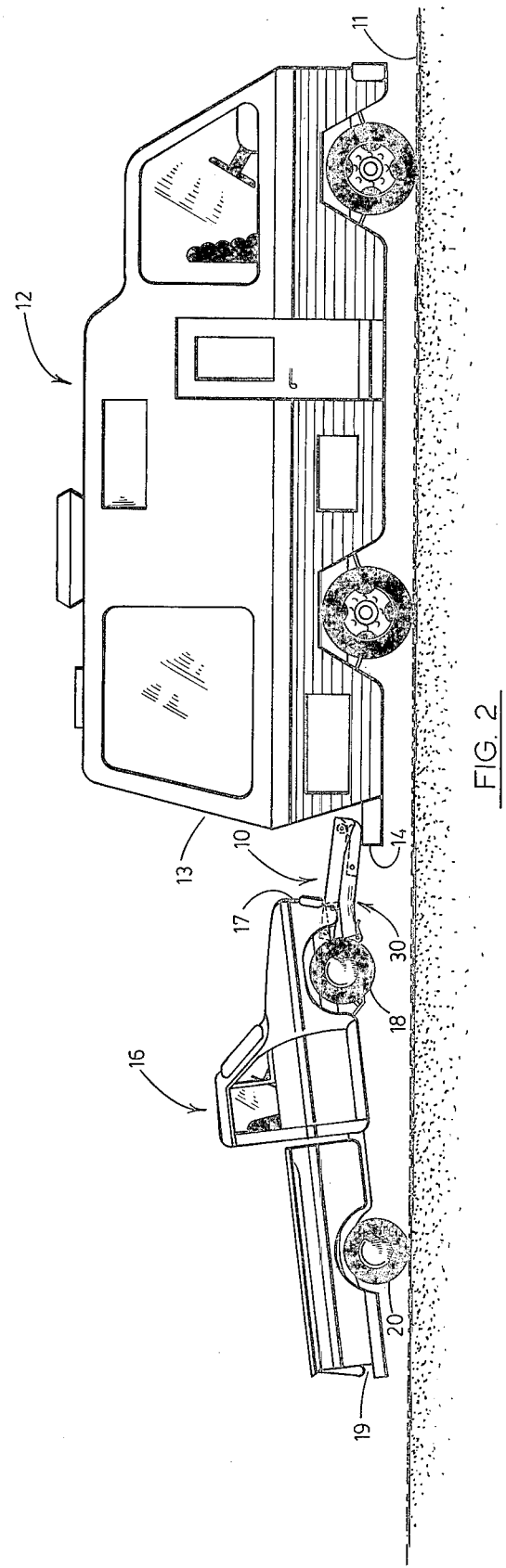
FIG. 2 is a side elevation showing the attitude of the device and the positions of the vehicles after coupling has been accomplished.

The operation of the described embodiment of the subject invention is believed to be clearly apparent and is briefly summarized at this point. The coupling device 10 of the present invention is adapted for use in towing virtually any type of vehicle. Use of the coupling device requires installation of the mounting member 90 on the underside of the vehicle to be towed. The most appropriate position and means for attaching the mounting member are, of course, dependent upon the specific vehicle to be towed. In the illustrative embodiment shown in FIGS. 1, 2 and 9, the vehicle 16 has a front mounted engine, not shown, providing drive to the rear wheels 20. In such rear wheel drive vehicles, the mounting member 90 should ordinarily be mounted on the underside of the front portion 17 of the vehicle, as best shown in FIGS. 1, 2 and 9. Conversely, in front wheel drive vehicles and in those vehicles having automatic transmissions, it is normally preferred that the mounting member 90 be secured on the underside of the rear portion of the vehicle. This variation in the place of installation of the mounting member does not vary the operation of the coupling device. Usage of the coupling device remains substantially the same in both cases except in the respects hereinafter to be pointed out.

Mounting of the member 90 on the underside of the vehicle 16 is, of course, controlled to some extent by the specific structure of the underside of the vehicle. Preferably the rear portion 100 of the mounting member is secured, as by welding, on frame members, not shown, on the underside of the front portion of the vehicle. If necessary, suitable metal straps or braces can be employed to reinforce mounting of the member on the underside of the vehicle. The mounting member 90 is secured in position so as to be in substantial alignment with the longitudinal axis of the vehicle and in a position so that the front portion 95 thereof is just under the front portion 17 of the vehicle, as best shown in FIG. 9. As much of the rear portion 100 of the mounting member as necessary to the left of the pin 98, as viewed in FIG. 3, can be cut away to facilitate installation. In any event, once the mounting member 90 has been secured in position, it need not be removed and will not otherwise interfere with operation of the vehicle even when the coupling device 10 is not mounted thereon. The mounting member is the only portion of the coupling device which need be more or less permanently attached to either of the vehicles.

When it is desired to tow vehicle 16 with the towing vehicle 12, the ramp member 30 is mounted on the ball hitch 15 of the towing vehicle, as shown in FIG. 7. This is accomplished by loosening the screw handle 50 to open the ball socket 49 for receipt of the ball hitch 15 therewithin. Subsequently, by reaching into the recess 39 of the ramp member, the screw handle 50 is tightened into position to secure the hitch 46 on the ball hitch 15. The ramp member, being pivotally mounted on the rear portion 47 of the hitch, is gravitationally pivoted downwardly into the position shown in FIG. 7 so that the slide plate 55 engages the earth surface 11.

The control member 70 is secured into position on the mounting member 90 by sliding the rear portion 81 over and about the front portion 95 of the mounting member so that the front portion is received within the recess 82 of the control member, as best shown in FIG. 9. The members 70 and 90 are slidably interfitted until the pin 83 is received in the pin slot 96. The pin 85 is then inserted through the pin holes 84 and the sleeve 97 to retain the control member in the downwardly and forwardly extending position from the front of the vehicle as shown in FIGS. 1, 2 and 9. When the control member is mounted in this position, the front portion 75 thereof is spaced from and above the earth surface 11 even while both the front and rear wheels 18 and 20 of the vehicle are in ground engagement.

The vehicle 16 is then driven forwardly toward the ramp member 30 causing the front portion 75 of the control member to contact and slide upwardly on the upper surface 36 of the ramp member, as illustrated in FIG. 1. The curved portions 78 of the guide plates 77 slide along the opposite side walls 37 of the ramp member while the roller 80 rolls along the upper surface 36 of the upper wall 35. As the vehicle 16 is driven forwardly, the inclination of the ramp member causes the front wheels 18 of the vehicle to be raised from ground engagement. Since drive is supplied to the rear wheels 20 of the vehicle, continued forward movement is possible. Similarly, the guide plates 77 operate to steer the front portion 17 of the vehicle so as to maintain alignment between the ramp member 30 and control member 70. The vehicle is driven slowly forward until the roller 80 of the control member contacts the concave surface 52 of the stop assembly 51. When the roller and thus the weight of the vehicle supported on the upper surface 36 of the ramp member passes beyond the pin 45 about which the ramp member is pivotally mounted on the hitch 46, the weight of the vehicle causes the ramp member to be pivoted thereabout from the position shown in phantom lines in FIG. 9 to the position shown in full lines in FIG. 9. Since the stop assembly 51 is just beyond the pin 45, the raising or pivoting of the ramp member is accomplished smoothly and without sudden movement. When this position has been reached, the operator locks the brakes of the vehicle 16 so as to retain the vehicle in this attitude. Thereafter, the lock assembly 57 is operated, using the lever arm 60, to engage the latches 59 individually on the opposite ends 99 of the pin 98. This lockably interconnects the ramp member 30, control member 70 and mounting member 90 in the configuration shown in FIGS. 2 and 9.

Subsequently, the brakes of the vehicle 16 are released and the vehicle is placed in a condition for towing using any suitable safety chains, auxiliary taillights, or the like as may be desired or required by law. The towing vehicle 12 can then be operated in a normal manner to tow the vehicle 16. The hitch 46 operates during such towing movement to allow pivotal movement between the two vehicles about the axis of the ball hitch 15. The coupling device operates to retain the front wheels 18 of the vehicle 16 out of engagement with the earth surface during such towing operations.

The coupling device 10, as previously noted, can also be used with a variety of other types of vehicles. Where a front wheel drive vehicle is to be towed, the same mounting configuration can be used with the mounting member 90 and control member 70 mounted on the underside of the front of the vehicle. However, the procedure for interconnecting the vehicles is varied to some degree. The vehicle 16 is left in stationary position in this case with its brakes locked and the towing vehicle 12 is backed toward the vehicle 16 to accomplish the interconnection as otherwise already described. The reason for this variation is, of course, that the drive wheels will, in this case, be lifted from ground engagement and this cannot be accomplished with the vehicle driven forwardly since the front wheels are removed from ground engagement during the procedure.

Where the vehicle 16 to be towed is a vehicle having an automatic transmission or where, for whatever reason, it may otherwise be desired, the mounting member 90 is preferably secured on the underside of the rear portion 19 of the vehicle 16 so as to mount the control member 70 extending rearwardly and downwardly therefrom. In this case, the towing vehicle 12 is backed toward the rear portion of the vehicle 16 to accomplish the interconnection as otherwise already described. In all cases where the towing vehicle 12 must be backed to establish the interconnection, the slide plate 55 operates to facilitate sliding movement between the ramp member 30 and the earth surface 11.

Therefore, the coupling device of the present invention operates rapidly, efficiently and dependably to interconnect a pair of vehicles for towing while simultaneously raising a selected pair of wheels of the vehicle to be towed out of ground engagement for towing without requiring the use of auxiliary equipment or operation by more than one person.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for raising from ground engagement a ground transporting portion of a vehicle to be towed while converting to an attitude for towing, the device comprising a rigid control member having a predetermined end portion; means for rigidly mounting the control member on the vehicle in fixed position relative to said ground transporting portion of the vehicle to be raised with the end portion of the control member disposed in proximity to the ground; a ramp member having opposite ends; and means for mounting the ramp member on a towing vehicle for movement from an inclined attitude, with an opposite end supported by the ground, in response to relative movement between said vehicles to cause the end portion of the control member to move upwardly along the ramp member to raise from ground engagement said ground transporting portion of the vehicle and to elevate said opposite end of the ramp member.

2. The device of claim 1 wherein said mounting means is adapted to mount the ramp member for movement substantially about a position remote from said opposite end supported by the ground in the inclined attitude and adjacent to the other of said opposite ends of the ramp member whereby the ramp member is moved from the inclined attitude upon movement of the end portion of the control member to a position between said position and the adjacent opposite end of the ramp member.

3. The device of claim 1 wherein said ground transporting portion of the vehicle includes a pair of wheels to be raised from ground engagement and the control member is mounted on the vehicle in substantial alignment with the longitudinal axis of the vehicle.

4. The device of claim 1 wherein the control member and mounting means therefore have respective lower walls defining a predetermined angle and the ramp member has an upper surface defining substantially the same predetermined angle to mate with said lower walls when the ramp member is elevated from the inclined attitude.

5. The device of claim 4 including means for lockably interconnecting the control member and mounting means therefore and the ramp member when elevated.

6. A device for simultaneously raising from a supporting surface a transporting portion of a vehicle to be towed and orienting said vehicle in trailing relation to a towing vehicle for coupling, the device comprising a ramp member having an end adapted to be supported by the supporting surface and an end opposite thereto; means borne by the ramp member for mounting the ramp member on a towing vehicle for moving, in response to downward pressure applied to the ramp member adjacent to said opposite end, from an inclined attitude, with said supported end supported by said surface and the ramp member inclined therefrom, to an elevated attitude, with said supported end upwardly spaced from the surface; a control member having a predetermined end portion; and means for ragidly mounting the control member on the vehicle to be towed in fixed position relative to the transporting portion of the vehicle with said end portion of the control member in adjacent proximity to said surface for relative movement upwardly along the ramp member, by movement of at least one of said vehicles, between a position in which said end portion of the control member is in contact with the ramp member adjacent to the supported end thereof and a position raised therefrom in which said end portion of the control member is rested on the ramp member adjacent to the opposite end portion thereof to apply said downward pressure to the ramp member.

7. The device of claim 6 including means for locking the ramp member and the control member relative to each other in said elevated attitude for towing.

8. The device of claim 7 wherein the ramp member has an upper surface having a predetermined configuration and the control member has a lower wall having a configuration adapted for nested engagement with the upper surface of the ramp member in said elevated attitude.

9. The device of claim 6 including guide means borne by the predetermined end portion of the control member having a pair of rigid plates extending downwardly therefrom spaced from each other for passage in juxtaposition to and on opposite sides of the ramp member during movement to and from the raised position to preclude misalignment of the ramp member and control member.

10. The device of claim 9 wherein the predetermined end portion of the control member has means between the plates of said pair to ease movement between said predetermined end portion and the ramp member.

11. A device for elevating from a supporting surface a pair of wheels of a vehicle to be towed while converting to an attitude for towing, the device comprising a first member, having a surface supported end and an opposite end, adapted to be mounted on a towing vehicle for movement substantially about a mounting position adjacent to said opposite end between an inclined attitude rigidly braced in supported relation on and extending between the supporting surface and the towing vehicle and a raised attitude with the surface supported end raised above the supporting surface for towing; and a second member having a predetermined end portion and adapted to be mounted on the vehicle to be towed endwardly extending therefrom with the predetermined end portion rigidly disposed with respect to the vehicle to be towed for engagement with the first member in the inclined attitude for relative movement in one direction therealong toward said mounting position to raise said pair of wheels of the vehicle to be towed from rested engagement with the supporting surface and to move the first member to the raised attitude by relative movement beyond said mounting position and for relative movement in the opposite direction along the first member to return the first member to the inclined attitude and said pair of wheels of the vehicle to be towed to rested engagement with the supporting surface.

* * * * *